US012223555B2

(12) United States Patent
Dalton et al.

(10) Patent No.: US 12,223,555 B2
(45) Date of Patent: Feb. 11, 2025

(54) EXPERIENCE BASED SOCIAL MEDIA PLATFORM

(71) Applicant: LIFE ENHANCEMENT MEDIA, LLC, Lehi, UT (US)

(72) Inventors: Stanley B. Dalton, Lehi, UT (US); Stanley Thomas Dalton, Lehi, UT (US)

(73) Assignee: Life Enhancement Media, LLC, Lehi, UT (US)

( * ) Notice: Subject to any disclaimer, the term of this patent is extended or adjusted under 35 U.S.C. 154(b) by 0 days.

(21) Appl. No.: 17/741,091

(22) Filed: May 10, 2022

(65) Prior Publication Data

US 2023/0368310 A1 Nov. 16, 2023

(51) Int. Cl.
*G06Q 50/10* (2012.01)
*G06Q 30/0251* (2023.01)
*G06Q 50/00* (2012.01)

(52) U.S. Cl.
CPC ......... *G06Q 50/01* (2013.01); *G06Q 30/0269* (2013.01)

(58) Field of Classification Search
CPC ................ G06Q 30/0269; G06N 20/20
See application file for complete search history.

(56) References Cited

U.S. PATENT DOCUMENTS

| | | | |
|---|---|---|---|
| 2007/0288478 A1* | 12/2007 | DiMaria | G06F 16/44 |
| 2013/0246397 A1 | 9/2013 | Farver et al. | |
| 2018/0216946 A1 | 8/2018 | Gueye | |
| 2022/0067788 A1* | 3/2022 | Raviv | G06Q 30/0271 |
| 2023/0063334 A1* | 3/2023 | Matsuoka | G06Q 10/06316 |

OTHER PUBLICATIONS

Montserrat Batet, Antonio Moreno, David Sánchez, David Isern, Aïda Valls, Turist@: Agent-based personalised recommendation of tourist activities, Jun. 15, 2012, Expert Systems with Applications, vol. 39, Issue 8, pp. 7319-7329 (Year: 2012).*
International Search Report and Written Opinion mailed Sep. 7, 2023 for PCT Application No. PCT/US2023/018159 (16 pages).

* cited by examiner

*Primary Examiner* — E Carvalho
(74) *Attorney, Agent, or Firm* — Dorsey & Whitney LLP

(57) ABSTRACT

An example method includes receiving, from a user device, a first challenge content for inclusion in a challenge list and identifying, based on the challenge content and selection criteria, additional challenge content suggested for inclusion in the challenge list. The method further includes displaying the additional challenge content at a user interface of the user device and updating the selection criteria based on whether the additional challenge content is selected for inclusion in the challenge list.

12 Claims, 10 Drawing Sheets

EXPERIENCE BASED SOCIAL MEDIA PLATFORM

TECHNICAL FIELD

The present application relates to systems providing a social media platform focused on experience based content.

BACKGROUND

Social media platforms are generally used to share information and stay in touch with social contacts. However, content on traditional social media platforms can be largely negative or unengaging, causing users to lose interest in the platforms. Further, it can be difficult for users to control how or if their data are used in many social media platforms, causing more users to disengage. Advertisers, such as businesses, often seek ways to engage more meaningfully with users on social media platforms.

SUMMARY

An example method disclosed herein includes receiving, from a user device, a first challenge content for inclusion in a challenge list and identifying, based on the challenge content and selection criteria, additional challenge content suggested for inclusion in the challenge list. The method further includes displaying the additional challenge content at a user interface of the user device and updating the selection criteria based on whether the additional challenge content is selected for inclusion in the challenge list.

In some examples of the method, the selection criteria includes one or more user preferences associated with the user device.

In some examples of the method, the additional challenge content is selected from a database of challenge content associated with challenges publicly available to the user device.

In some examples of the method, the selection criteria includes the additional challenge content being associated with a similar challenge list in the database of challenge content.

In some examples of the method, identifying the additional challenge content includes providing the first challenge content to a machine learning model trained to identify the additional challenge content for inclusion in the challenge list based on challenge content already selected for the list.

In some examples of the method, updating the selection criteria includes updating the machine learning model by providing an indication of whether the additional challenge content is selected for inclusion in the challenge list to the machine learning model through a feedback loop.

In some examples, the method further includes identifying a second additional challenge for inclusion in the challenge list based on the first challenge content, the additional challenge content, and the updated selection criteria.

In some examples, the first challenge content includes one or more of completion of an outdoor activity, visiting a predetermined number of tourist locations, completing an artistic activity, cooking a predetermined meal, running a marathon, visiting a predetermined number of locations of a restaurant, and reading a predetermined number of books.

An example method disclosed herein includes selecting a plurality of content items for display at a user device based on a user profile associated with the user device, where the user profile includes information about the user associated with an experience based social media platform. The method further includes configuring one or more display characteristics of the content items based on a predicted relative interest of a user associated with the user profile and transmitting the content items for display at the user device through an interface of the experience based social media platform.

In some examples of the method, the predicted relative interest of the user associated with the user profile is based on completion of challenges by the user within the experience based social media platform.

In some examples of the method, the predicted relative interest of the user associated with the user profile is based on completion of challenges by other users associated with the user within the experience based social media platform.

In some examples of the method, the predicted relative interest of the user associated with the user profile is based on completion of challenges by other users similar to the user within the experience based social media platform, where the other users are identified based on similarity between user profiles of the other users and the user profile of the user.

In some examples of the method, the display characteristics include relative size of the content items at the user interface of the experience based social media platform.

In some examples of the method, the display characteristics include the relative location of the content items within the user interface of the experience based social media platform.

In some examples, the method further includes updating the user profile based on selection, at the user device, of a content item of the content items.

An example method disclosed herein includes storing a digital reward associated with a commercial entity and a user device, detecting that the user device is within a threshold range of a location associated with the commercial entity, and generating a notification for display at the user device indicating that the digital reward is available for use at the location.

In some examples of the method, the digital reward is provided to the user device based on completion of a challenge presented through an experience based social media platform by a user associated with the user device.

In some examples of the method, the challenge is associated with a limited number of digital rewards provided to a first number of users of the experience based social media platform completing the challenge.

In some examples of the method, the digital reward is associated with an expiration date and the method further includes generating a notification that the expiration date of the digital reward is within a threshold range of a current date.

In some examples of the method, the notification is selectable to generate a code allowing the user to redeem the digital reward at the location through the user device.

In some examples of the method, the notification is selectable to place an order for an item associated with the digital reward, where the order is placed through the user device.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

The experience based social media platform described herein may provide users with options to create and complete challenges, lists of challenges (e.g., "bucket lists"), and to post content associated with completion of challenges. Such experience based content may allow users to engage with one another in a positive manner, increasing user engagement with the platform. Further the platform may allow businesses, entities, and other sponsored users to engage with users by sponsoring challenges, providing rewards for completion of challenges, designing custom challenges, and the like. Such methods of engagement may allow businesses to engage with possible customers in ways beyond traditional advertising and promotion. Further, the platform may include privacy settings allowing users transparency with respect to how user data are utilized and to control how user data are utilized within the platform. Such privacy and data controls may increase user engagement, as users know exactly how their data are managed and utilized by the platform.

Generally, the platform may, upon login, display for users content related to challenges available for completion through the platform. The challenges may be selected based on user interests, popularity, geographical proximity to the user, engagement by friends or connections of the user, and the like. The platform may also present users with content, such as photographs, videos, and text, from other users related to completion of challenges through the platform. Users may have the option to view more details about individual challenges, accept challenges, complete challenges, post content related to challenges, and the like through the platform. Further, users may create challenge lists (e.g., bucket lists) to set goals, plan activities with groups of friends, and the like. Users may earn badges, digital rewards, and similar rewards for completion of challenges. Badges, accepted challenges, user created challenges, user content related to challenges, and the like may be visible to other users through a user profile page.

The platform may offer several features to businesses, influencers, and other "power profiles" to engage with users of the platform. For example, businesses may be able to create challenges related to their business (e.g., visiting a number of locations of a restaurant), sponsor existing challenges related to their business (e.g., a running apparel company may sponsor a challenge to run a marathon), and/or provide rewards, such as coupons and merchandise and/or recognition of some kind, to users in connection with completion of challenges. Accordingly, businesses may engage with potential customers in new ways.

Figure 1:
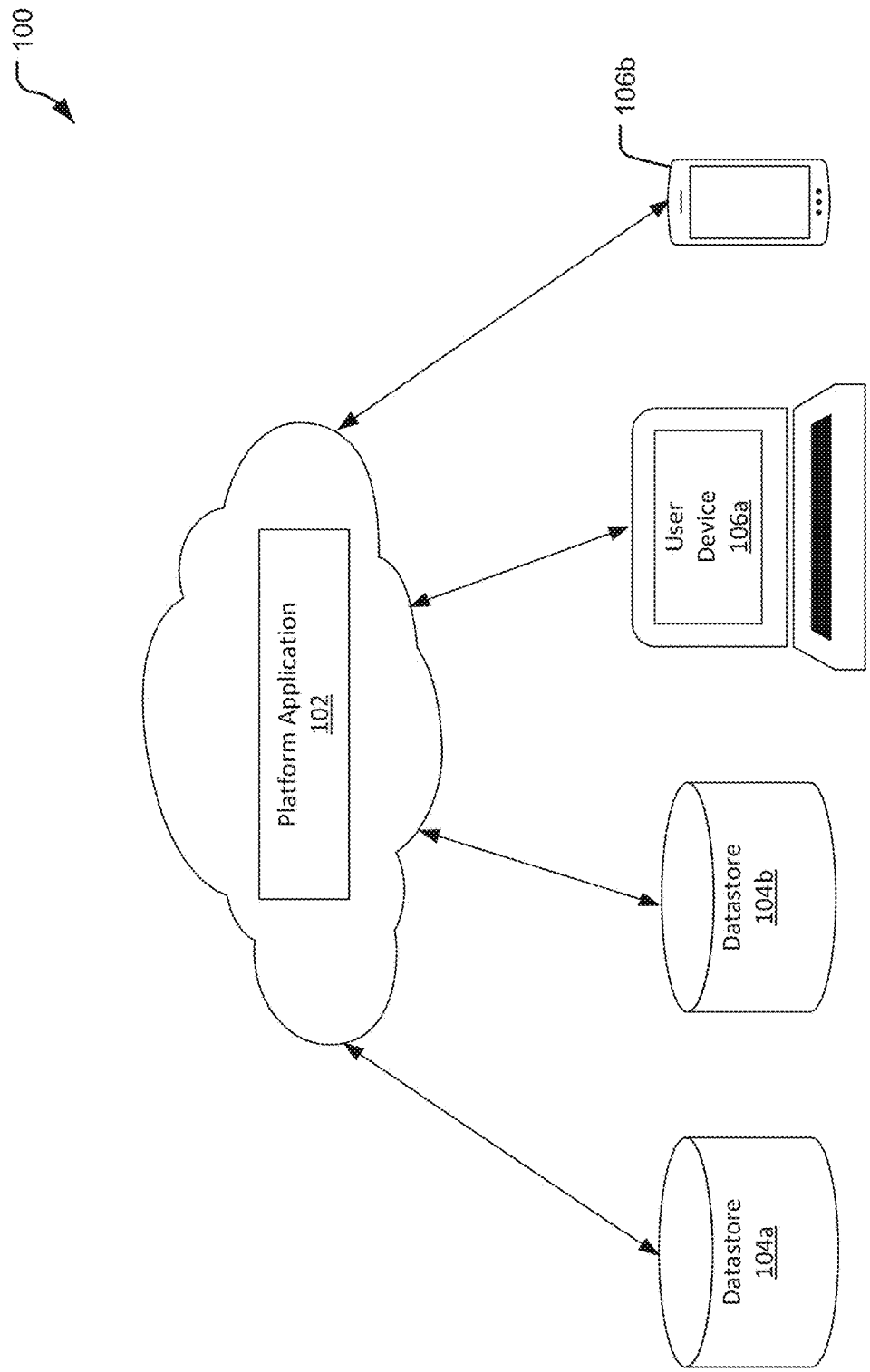
FIG. 1 illustrates an example system for a platform application in accordance with various embodiments of the disclosure.

Various embodiments of the present disclosure will be explained below in detail with reference to the accompanying drawings. Other embodiments may be utilized, and structural, logical and electrical changes may be made without departing from the scope of the present disclosure. FIG. 1 illustrates an example system for a platform application in accordance with various embodiments of the disclosure. Various user devices (e.g., user devices 106a and 106b of FIG. 1) may connect to the platform application 102 to access and utilize the platform application 102. The user devices 106a and 106b may access the platform application 102 using a mobile application, web page, desktop application, or other methods. As shown in FIG. 1, the platform application 102 may, in various examples, be hosted in a cloud computing environment, accessible by the user devices 106a and 106b. In other examples, the platform application 102 may reside on one or more servers (e.g., web servers) accessible by the user devices 106a and 106b and the datastores 104a and 104b.

The platform application 102 may communicate with several datastores (e.g., datastores 104a and 104b). Such datastores may contain various data used by the platform application such as user data (e.g., preferences, challenge history, earned rewards, location, and the like) and challenge information. For example, a datastore 104a may store information about users of the platform application 102 and datastore 104b may store information about challenges available for completion using the platform application 102. The platform application 102 may utilize other types of data, such as map data, weather data, and the like. In some examples, the platform application 102 may communicate and/or interface with additional applications or services not shown in FIG. 1. For example, the platform application 102 may obtain user information from other social networking sites when granted permission by the user.

Figure 2:
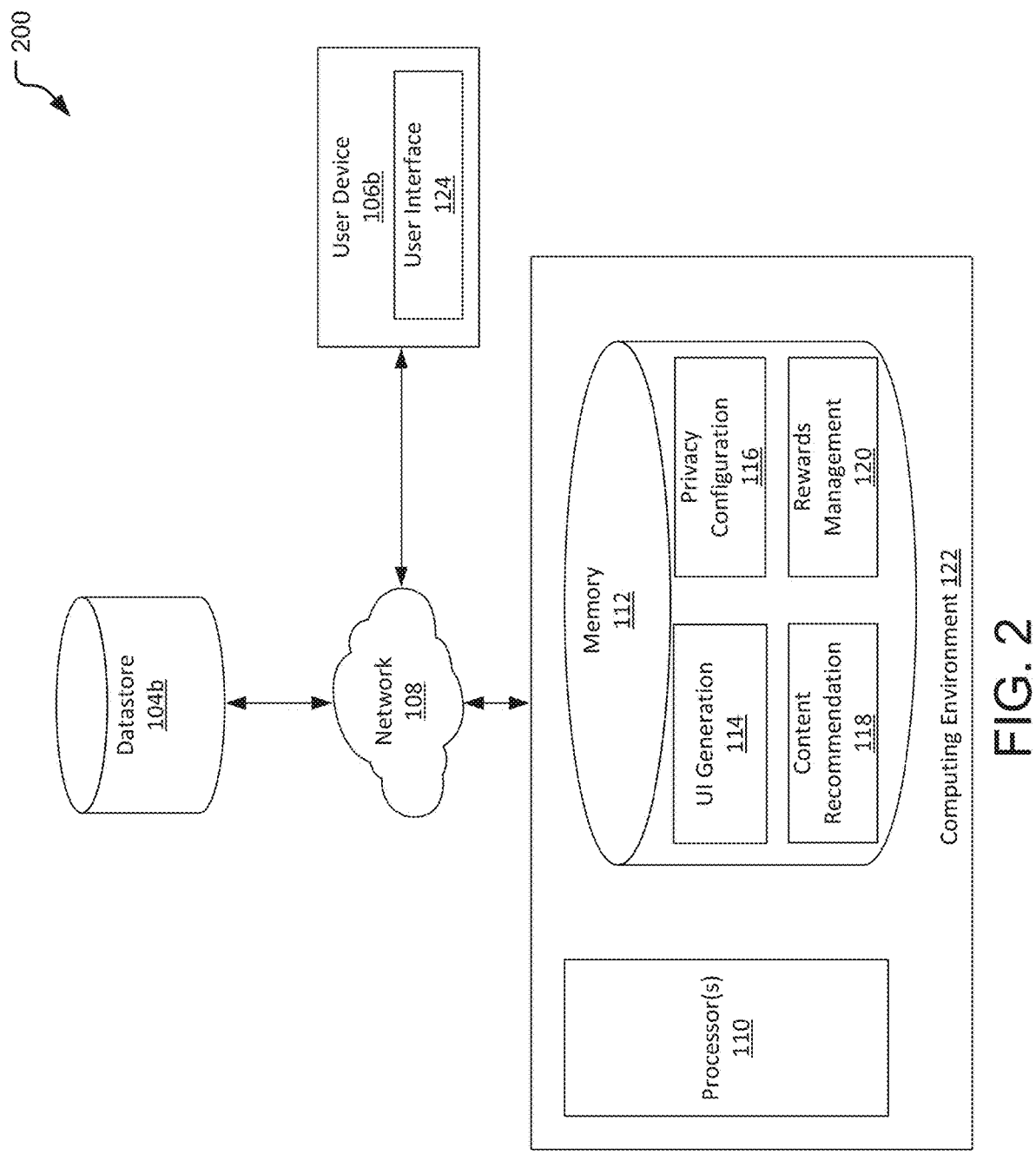
FIG. 2 illustrates an example computing environment for a platform application in accordance with various embodiments of the disclosure.

FIG. 2 illustrates a more detailed example system 150 for the platform application 102 in accordance with various embodiments of the disclosure. The platform application 102 may be implemented at a computing environment 122. The computing environment 122 may include memory 112 storing instructions for user interface (UI) generation 114, privacy configuration 116, content recommendation 118, and rewards management 120. Such instructions, when executed by one or more processors 110 of the computing environment 122 may implement various functionalities of the platform application 102. The computing environment 122 may communicate with one or more datastores 104b via a network 108. One or more user device 106b may communicate with the platform application 102 at the computing environment 122 via the network 108 to utilize UI generation 114, privacy configuration 116, content recommendation 118, and/or rewards management 120. In some examples, a user interface 120 of the user device 106b may be used to provide information (e.g., input data) to, and display information (e.g., content) from the platform application 102.

Generally, the user device 106b may be a device belonging to an end user accessing the system 100. In various embodiments, multiple user devices 106b may be provided with access to the platform application 102 to utilize UI generation 114, privacy configuration 116, content recommendation 118, and/or rewards management 120. Where multiple user devices 106b access the platform application 102, the user devices 106b may be provided with varying permission, settings, and the like, and may be authenticated by an authentication service prior to access the platform application 102. In various implementations, the user device 106b and/or additional user devices may be implemented using any number of computing devices included, but not limited to, a desktop computer, a laptop, tablet, mobile phone, smart phone, wearable device (e.g., AR/VR headset, smart watch, smart glasses, or the like), smart speaker, vehicle (e.g., automobile), or appliance. Generally, the user device 106b may include one or more processors, such as a central processing unit (CPU) and/or graphics processing unit (GPU). The user device 106b may generally perform operations by executing executable instructions (e.g., software) using the processors.

In some examples, the user interface 124 at the user device 106b may be used to provide information (e.g., input data) to, and display information (e.g., content) from the platform application 102. In various embodiments, the user interface 124 may be implemented as a React, Javascript-based interface for interaction with the platform application 102. The user interface 124 may also access various components of the platform application 102 locally at the user device 106b, through webpages, one or more applications at the user device 106b, or using other methods. The user interface 124 may also be used to display content generated by the platform application 102, such as user profiles, challenges, challenge lists, digital rewards, and other data and/or visual output generated by the platform application 102.

The network 108 may be implemented using one or more of various systems and protocols for communications between computing devices. In various embodiments, the network 108 or various portions of the network 108 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like. Various components of the system 100 may communicate using different network protocols or communications protocols based on location. For example, components of the platform application 102 may be hosted within a cloud computing environment and may communicate with each other using communication and/or network protocols used by the cloud computing environment.

The system 100 may include one or more datastores 104a and 104b storing various information and/or data including, for example, user data, challenge data, and the like. For example, one or more datastores 106 may include user profile data, including user interests, location, challenges accepted by the user, challenges and/or challenge lists created by the user, friends or connections of the user, and the like. Challenge data may include, in various examples, challenge name, location, category, creator, sponsor (e.g., a company sponsoring a challenge), rewards associated with the challenge, and/or other information relating to challenges. In some examples, challenge data may include a database of challenges available through the platform application 102.

In various examples, a challenge database, including various challenge data, may be stored at one or more of datastores 104a and 104b. The challenge database may be initially populated by generic challenges, and challenge data for additional challenges may be added to the challenge database as the additional challenges are created by users, companies, organizations, etc. Challenge data may be stored in the challenge database according to a classification or hierarchical scheme of the challenge database. For example, a rock climbing challenge at Yosemite National Park may be classified as an outdoor activity, an outdoor adventure activity (which may be a subgroup of outdoor activities), and a rock climbing activity (which may be a subgroup of outdoor adventure activities). The challenge may further be classified based on geographic location such as a National Park activity, an activity in California, an activity in the Sierra Nevada Mountains, etc. As new challenges are added to the challenge database, they may be classified using the classification or hierarchical scheme of the challenge database. In some examples, new categories may be created for newly added challenges.

Challenges may be tracked and classified in the challenge database using tags, metadata, and the like. Such tags, metadata, and classifications may be used to match items in the challenge database to individual users. For example, a challenge (e.g., exploring the grand canyon) may have a first parent category (e.g., tourism) and several sub-categories (e.g., national parks, sightseeing, wonders of the world, popular tourist attractions in the United States) under the first parent category. The sub categories may each have further sub-sub-categories, becoming more specific in nature. The challenge may further be associated with additional parent categories (e.g., outdoor recreation, photography, geology, geography, history, and the like), which additional parent categories may include additional sub-categories and/or sub-sub-categories. Accordingly, challenges may be presented to users showing an interest in any of the parent categories, sub-categories, and/or sub-sub-categories associated with the challenge. This allows challenges to be presented to a wider audience and to an audience of users likely to be interested in the challenge. The challenges may be further associated with metadata such as geolocation information, associated costs, age restrictions, physical difficulty, contact information (e.g., phone number, email, website) for an entity or person in charge of or associated with the challenge, content generated by other users who have completed the challenge, and the like.

In some examples, the taxonomy of the challenge database may be implemented using a coding system including codes associated with parent categories and sub-categories. For example, outdoor recreation may have a commercial code of "1OR" and the subcategories water activities, hiking activities, and camping activities may be associated with codes "a," "b," and "c," respectively. Accordingly, a challenge categorized under outdoor recreation with subcategories water activities, hiking activities, and camping activities may be associated with a code "1OR-abc." Such code may be stored with the challenge as metadata. In various examples, such codes may be used by businesses desiring to sponsor specific challenges in the challenge database. For example, companies may set up alerts or otherwise select advertising for challenges associated with the code 1OR-abc. In some examples, the challenge database may be licensed to other entities to benefit users. For example, travel companies may be provided with an application programming interface (API) to the database to book travel on behalf of users completing challenges in the challenge database and/or to suggest activities to users who book travel to a particular location. For example, where a user allows their data from the platform application 102 to be provided to the travel provider, the user travel provider may recommend, using the challenge database, certain activities to the user after the user books a trip using the travel provider.

In various implementations, the computing environment 122 may include or utilize one or more hosts or combinations of compute resources, which may be located, for example, at one or more servers, cloud computing platforms, computing clusters, and the like. Generally, platform application 102 is implemented by the computing environment 122, which includes compute resources including hardware for memory 112 and one or more processors 110. For example, the computing environment 122 may utilize or include one or more processors, such as a CPU, GPU, and/or programmable or configurable logic. In some embodiments, various components of the computing environment 122 may be distributed across various computing resources, such that the components of the computing environment 122 communicate with one another through the network 108 or using other communications protocols. For example, in some embodiments, the computing environment 122 may be implemented as a serverless service, where computing resources for various components of the computing environment 122 may be located across various computing environments (e.g., cloud platforms) and may be reallocated dynamically and automatically according to resource usage of the platform application 102. In various implementations, the platform application 102 may be implemented using organizational processing constructs such as functions implemented by worker elements allocated with compute resources, containers, virtual machines, and the like.

The memory 112 may include instructions for various functions of the platform application 102, which, when executed by processor 110, preform various functions of the platform application 102. Similar to the processor 110, memory resources utilized by the platform application 102 and included in the computing environment 122 may be distributed across various physical computing devices.

When executed by the processors 110, the instructions for UI generation 114 may generate various user interfaces, which may be displayed, for example at a user interface 124 of the user device 106b. Such user interfaces may present content to the user from the platform application 102, such as challenges, challenge lists, user profiles, and the like. Such user interfaces may further be used to collect information from a user device 106b. For example, UI generation 114 may generate interfaces for creating new profiles, new challenge lists, accepting challenges, and the like.

In some examples, UI generation 114 may utilize information stored at memory 112 and/or at datastores accessible via the network 108 (e.g., datastore 104b). For example, UI generation 114 may access content, user data, challenge data, and the like, to render user interfaces of the platform application 102. In various examples, UI generation 114 may further determine how to render some content based on perceived interests of the user. For example, UI generation 114 may decide how prominent (e.g., at a prominent location or in a larger size) to make a piece of content based on how interesting the content is likely to be to the user, as discussed further herein.

When executed by the processors 110, the instructions for privacy configuration 116 may be utilized by users of the platform application 102 to protect the user's personal data and/or to view how the user's data are being used by the platform application 102. For example, privacy configuration may receive privacy settings from a user (e.g., through the user interface 124) and may access user data, challenge data, or other data to effectuate the user's privacy settings. For example, where a user makes a challenge private, privacy configuration 116 may access the challenge in a challenge database and mark the challenge private such that the challenge is not presented to or viewable by other users. Privacy configuration 116 may further track how user information is used (e.g., whether it is used to suggest new content, for advertisement, etc.). In some examples, such information regarding use of user information may be accessible by the user through the platform application 102.

In some examples, privacy configuration 116 may further configure privacy settings allowing a user to monetize user data associated with the user. For example, the user may choose to allow advertisements to the user based on the user data, effectively utilizing the user's social capital. In some examples, advertisers may pay a fee to advertise to users, and a user may receive a part of that fee when choosing to allow advertisement. The user may also utilize privacy configuration 116 to monetize parts of their user data without monetizing other parts of their user data. For example, the user may opt in to advertisements relating to some interests (as determined, e.g., by challenges the user participates in) while opting out of advertisements relating to other interests or information about the user (e.g., demographic information, data about users connected with user, and the like). Users may also, in various examples, choose to share their user data with other users of the platform for various purposes, such as allowing other users to view general areas of interests.

When executed by the processors 110, the instructions for content recommendation 118 may analyze user information and locate content likely to be of interest to the user based on the user information. For example, content recommendation 118 may access user data for a user of the platform application 102, including information provided by the user, information about the user's actions (e.g., challenges accepted and completed, content posted, and the like) on the platform application 102. Content recommendation 118 may then recommend content based on the user's interests. For example, content recommendation 118 may recommend challenges, challenge lists, categories of challenges, content, users to follow, and the like on a home page or other user interface of the platform application 102.

In some examples, content recommendation 118 may further suggest additional content for a user based on already selected content. For example, when a user builds a challenge list (e.g., bucket list), content recommendation 118 may suggest additional challenges for addition to the challenge list based on the first challenge selected by the user. In some examples, content recommendation 118 may include one or more machine learning models trained to identify similar content which may be of interest to users. For example, content recommendation 118 may include a neural network trained to identify additional challenges for inclusion in a challenge list based on selection of a first challenge. In some examples, such a machine learning model may be refined using feedback, including whether users ultimately incorporate suggested challenges into challenge lists. In various examples, content recommendation 118 may communicate content to UI generation 114 for display to the user.

When executed by the processors 110, the instructions for rewards management 120 may access stored rewards information relating to rewards earned by a user (e.g., through completion of challenges) and location information for a user device 106b. The location information may be obtained through, for example, connection to certain wireless networks, GPS data, Bluetooth connections, etc. Rewards management 120 may generally maintain and/or access information about rewards earned by a user, including a commercial entity associated with the rewards. Using location information, rewards management 120 may determine when the user device 106b is within a threshold distance of a location associated with the commercial entity where the user may be able to utilize earned rewards. Rewards management may communication with UI generation 114 to send an alert (e.g., a notification) to the user when the user is close to or at a location where the user can utilize an earned reward. In some examples, rewards management 120 may further notify a user of other events related to digital rewards, such as when a digital reward earned by the user is nearing expiration.

In various examples, the memory 112 may include additional instructions which, when executed by the processors 110, allow business to interact with the platform application 102. For example, businesses may be provided with privileged profiles in the platform application 102 (e.g., power profiles). Such profiles may be able to create challenges, sponsor challenge, advertise to users, and the like. Businesses may utilize privileged profiles to create ad campaigns tailored to niche markets which may otherwise be unreachable. For example, utilizing user data and the challenge database, a business may be able to advertise to a relatively narrow segment of users, such as users located in within 50 miles of a specific city who have engaged in or are interested in all you can eat challenges. Without the data utilized by the platform application 102, businesses may have a difficult time accessing such markets and may rely instead on proxies to locate desired users, such as demographic data. Privileged profiles may further be able to utilize data of the platform application 102 to conduct research, such as by ascertaining a number of customers who may be interested in a particular promotion.

In various examples, privileged profiles may further be able to create custom content related to challenges. For example, business users may be able to create custom badges for challenges sponsored by and/or created by the business. In some examples, business users may be able to generate advertisements delivered as content within the platform application 102.

Privileged profiles may further have access to tools allowing the privileged profiles to utilize functionality of the platform application 102. Such tools may include various views of information in, for example, the challenge database of the platform application 102. In some examples, such tools may include visualizations of the impact of advertisement campaigns, sponsored challenges, or other content created by the privileged profile within the platform application. For example, a diagram may show the topics (e.g., categories of the challenge database) related to the content, subgroups of users expected to be reached by the content, and the like. The diagram may be a graph, map, or other visualization of such information.

Additional tools may provide information about use of the platform application 102, to help privileged profiles plan advertising campaigns, adoption of challenges, and other activities, to reach the most users. For example, a calendar may show times of year, times of the week, etc., when users are likely to accept challenges in certain areas. For example, users may be more likely to engage with camping and hiking challenges in the summer and fall months. In other examples, tools may include views of analytics related to existing challenges or advertising content. For example, a business contemplating adopting a challenge may be able to view how many users have viewed the challenge, accepted the challenge, and the like. The business may also be able to view engagement with its existing challenges and/or advertisements. In other examples, a business may be able to view a map of content and/or reach. For example, the map may include locations of users reached by content, geographic locations connected to challenges sponsored by the business and the like. Such a map view may allow businesses to visualize their geographic reach and tailor advertising strategy to reach specific geographic areas.

When creating content, tools may allow privileged profiles to select features to the content. For example, businesses may be able to put time constraints on a challenge (e.g., users can only earn a badge for a challenge completed within a certain week or month), the addition of marketing content to challenges, configuring classifications and categories for a challenge, and the like. Such tools may also allow privileged profiles to plan challenges ahead of time and to schedule release of such challenges over extended periods of time. Businesses may utilize the calendar tool to locate times to run a campaign. Other tools may allow privileged profiles to export data, use e-commerce tools within the platform application 102, view user characteristics (e.g., social capital of various users), view analytics related to the power profile, research demographics by location, demographics, or other characteristics, and the like.

In various examples, privileged profiles may further be able to store and view advertisements, challenges, and other content created by the privileged profile. Such a library feature may allow businesses to view past content and use past content as a template for future content. For example, a business may run a New Year's themed challenge the first week of each calendar year. The business may be able to access the information about the previous year's challenge to use as a starting point when designing the next year's challenge. Collectively, the tools available to privileged users may allow such users to fully utilize the platform application 102 and the data encapsulated by the challenge database of the platform application 102.

Figure 3:
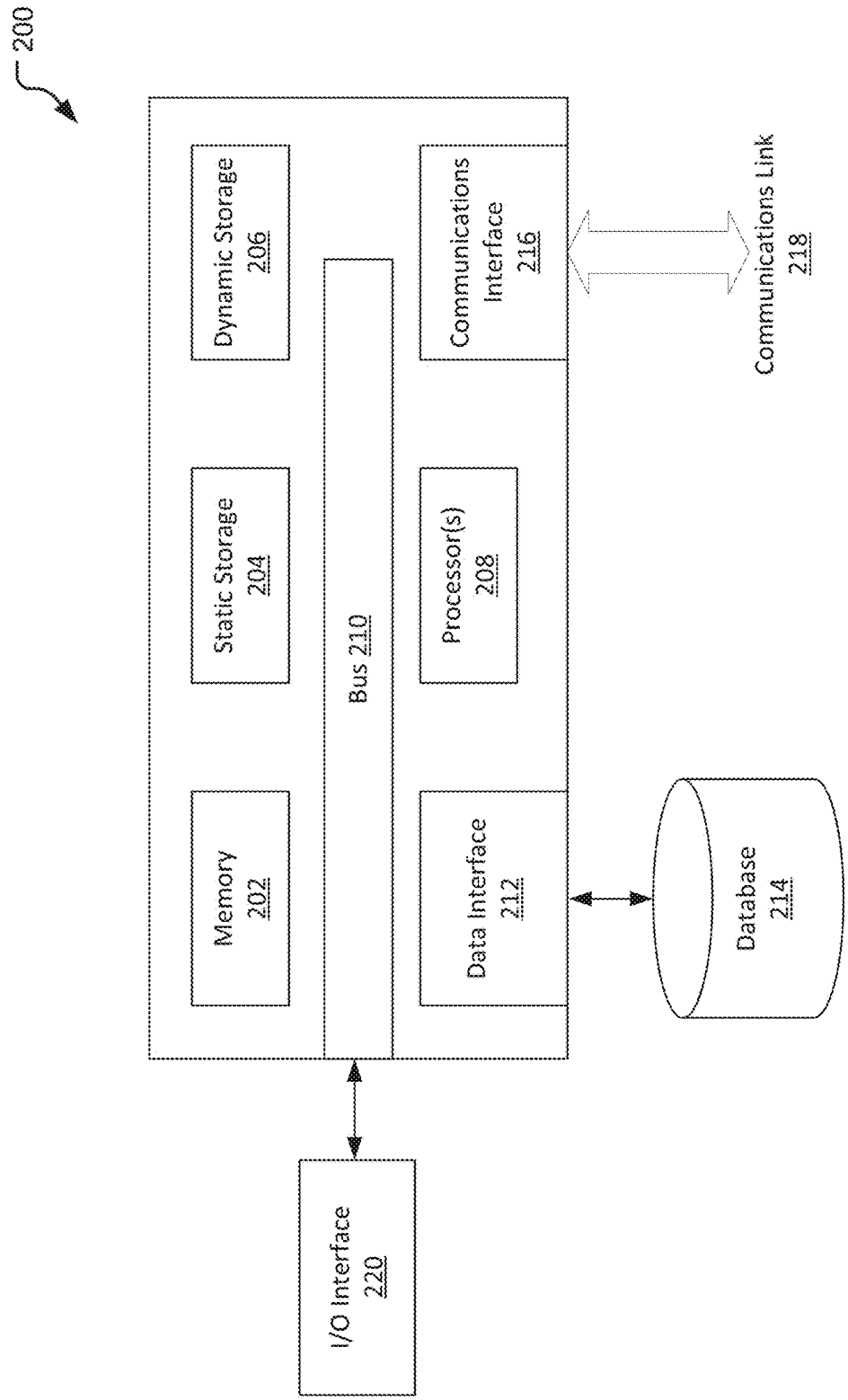
FIG. 3 is a schematic diagram of a computing system which may be used to implement various embodiments in the examples described herein.

FIG. 3 is a schematic diagram of a computing system 200 which may be used to implement various embodiments in the examples described herein. For example, processors 110 and memory 112 may be located at one or several computing systems 200. In various embodiments, user device 104 is also implemented by a computing system 200. This disclosure contemplates any suitable number of computing systems 200. For example, a computing system 200 may be a server, a desktop computing system, a mainframe, a mesh of computing systems, a laptop or notebook computing system, a tablet computing system, or a combination of two or more of these. Where appropriate, the computing system 200 may include one or more computing systems; be unitary or distributed; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 220 (e.g., a keyboard, keypad, mouse, microphone). In particular embodiments, the computing system 200 may include one or more of any such components.

In particular embodiments, processor 208 includes hardware for executing instructions, such as those making up a computer program. The processor 208 circuitry includes circuitry for performing various processing functions, such as executing specific software for perform specific calculations or tasks. In particular embodiments, I/O interface 220 includes hardware, software, or both, providing one or more interfaces for communication between computing system 200 and one or more I/O devices. Computing system 200 may include one or more of these I/O devices, where appropriate. One or more of these I/O devices may enable communication between a person and computing system 200.

In particular embodiments, communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate accesses to memory 202 requested by processor 208. In particular embodiments, bus 210 includes hardware, software, or both coupling components of computing system 200 to each other.

According to particular embodiments, computing system 200 performs specific operations by processor 208 executing one or more sequences of one or more instructions contained in memory 202. For example, instructions for UI generation 114, privacy configuration 116, content recommendation 118, and rewards management 120 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to, nonvolatile media and volatile media. Non-volatile media includes, for example, optical or magnetic disks, such as static storage 204 or dynamic storage 206. Volatile media includes dynamic memory, such as memory 202.

Computing system 200 may transmit and receive messages, data, and instructions, including programing (e.g., application code) through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212.

Figure 4:
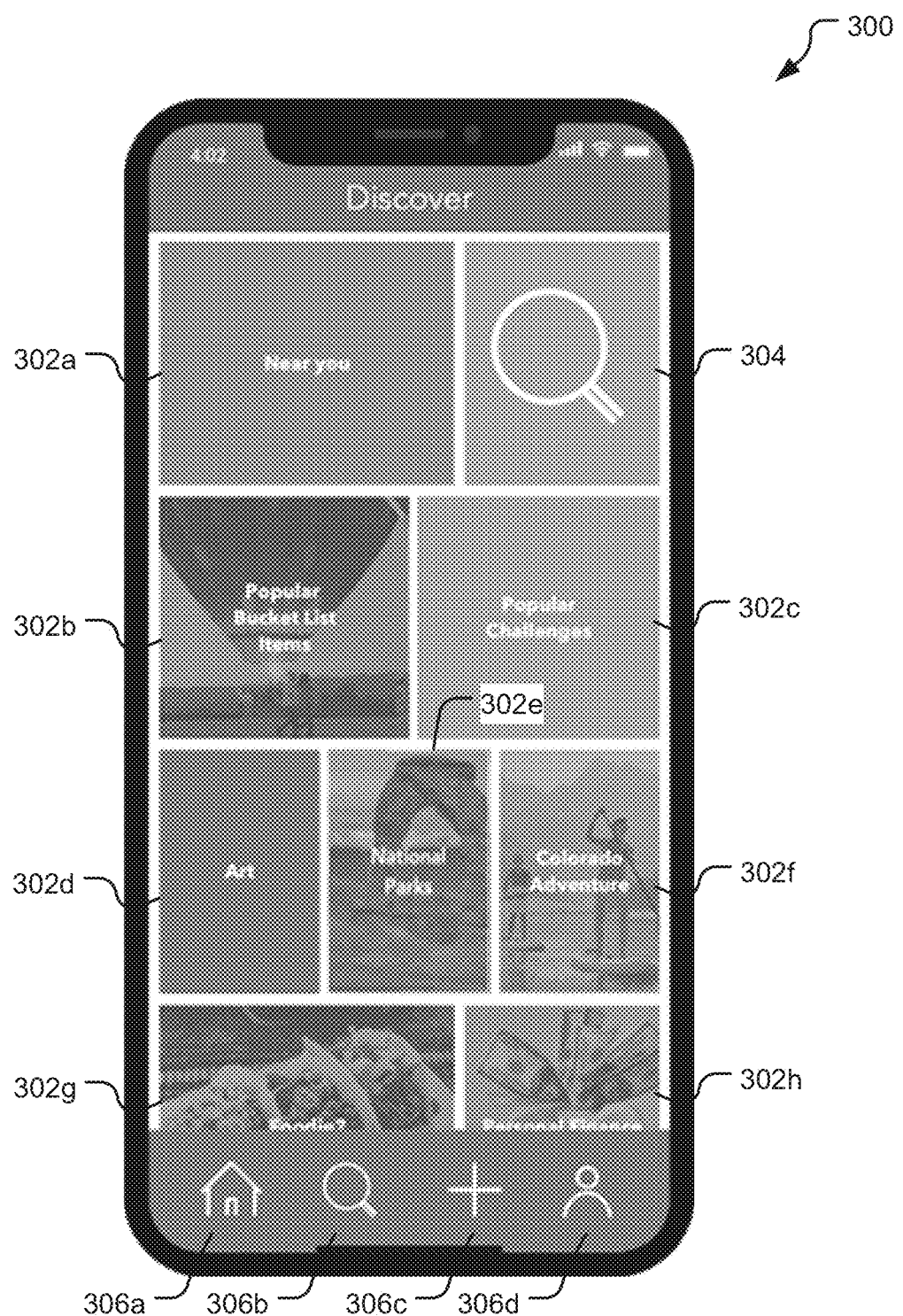
FIG. 4 illustrates an example user interface for interaction with the platform application in accordance with various embodiments of the disclosure.

FIG. 4 illustrates an example user interface 300 for interaction with the platform application 102 in accordance with various embodiments of the disclosure. The user interface 300 may be generated, for example, by the UI generation 114 of the platform application 102 and transmitted to a user interface 124 at a user device 106b via the network 108. The user interface 300 may be, in various examples, a home screen and/or the first screen a user sees once launching and/or connecting to the platform application 102. The user interface 300 may show content elements 302a-h, a search element 304, and/or navigation elements 306a-d, in various examples. The arrangement of elements in the user interface 300 is exemplary and may vary. For example, content 302a-h is shown in individual rectangular elements with multiple content items arranged horizontally and vertically on the display 300. In some examples, content 302a-h may instead be presented such that one content item is displayed across a width of the user interface 300 and additional content is viewed by, for example, scrolling down using a touch display, mouse, or other input device of the user device 106b presenting the user interface 300.

Content elements 302a-h may, in various examples, display individual challenges, individual challenge lists, content created by other users in connection with completion of challenges, categories of challenges, categories of challenge lists, and the like. Content elements 302a-h may be identified from a challenge database or other structure storing challenge data (e.g., at datastore 104a and/or 104b). For example, content element 302d may be selectable to show challenges related to art, while content element 302f may be selectable to show a challenge list for challenges to complete in Colorado. Some content elements may render similarly for all users, but may present different information when selected. For example, content element 302a may be selectable to show challenges near the user. Some content elements may be consistent for all users. For example, content element 302c may show challenges popular with all users of the platform application 102. In some examples, some content elements may be displayed based on temporal conditions. For example, seasonal challenges, holiday themed challenges, and the like may be displayed during certain predetermined time periods.

The content elements 302a-h may, in various examples, display as videos, text, photographs, pictures, and the like. In some examples, the content elements 302a-h may display text including a number of challenges and/or challenge lists within a category represented by the content element. In some examples, the content elements 302a-h in the user interface 300 may display dynamically. For example, about half of the content elements may display as text on a colored background, while the remainder of the content elements may display as pictures, videos, or other content. After some time interval (e.g., 10 seconds), the content elements that were being displayed as text may be rendered with video or pictures, while the content elements that were being displayed as videos or images may be rendered with text. Such features may help prevent the user interface 300 from becoming visually overwhelming for users.

Content elements 302a-h may be selected according to the user's interests in the content, activity of users connected to the user, and other criteria. For example, the content element 302e for a challenge list related to national parks may be chosen for the user based on previous engagement with challenges in national or state parks, or challenges including outdoor activities such as hiking, rock climbing, camping, fishing, etc. Content elements may further be chosen based on how a user's friends or connections engage with various challenges. For example, content element 302h may be displayed when a large portion of the user's connections engage with personal finance challenges. In some examples, the user interface 300 may further show content generated by other users (e.g., photographs, videos, text content) in connection with completion of challenges.

The content elements 302a-h may be sized or otherwise rendered based on the user's perceived interest in content displayed by the content elements 302a-h. For example, size, shape, location of content elements in the user interface 300, and/or other characteristics of the content elements 302a-h may be selected based on the user's actual or perceived preferences. Content elements 302a-h may, in various examples, be larger and/or may be placed more prominently within the user interface 300 when related to areas of higher perceived interest. For example, content element 302g may be rendered as larger than content element 302d based on the user's perceived interest in food related challenges over art related challenges (e.g., predicted relative interest). Such predicted relative interest may be based on the user's activity (e.g., the user has viewed, completed, and/or created a larger number of food related challenges), activity of other users associated with the user (e.g., friends of the user have completed more food related challenges), profile information of the user (e.g., activity of users who are similar to the user based on age, gender, location, stated interests, and the like), and/or other various criteria. In some examples, the content elements 302a-h themselves may be selected based on similar criteria.

In some examples, the user may select one or more of content elements 302a-h (e.g., to view more information about a challenge. In such examples, the user profile may be updated to reflect the user's selection of content elements 302a-h. Accordingly, selection of content elements 302a-h by the user may affect the user's perceived interest in other content items. In this way, content may become more tailored to the user over time (e.g., through more use of the experience based social media platform).

Alternatively or in addition to arranging content elements 302a-h by perceived interest, in some examples, the content elements 302a-h may be arranged within the user interface 300 chronologically. For example, content elements 302a-h related to content most recently uploaded to the platform application 102 may be displayed at the top of the user interface 300, with older content appearing as the user scrolls downward. In some examples, content elements 302a-h may be arranged based on other factors, such as popularity of content among all users of the platform application 102, sponsored content, promoted content, and the like.

In various examples, the content elements 302a-h may be selectable to display additional information about the content represented by the content elements 302a-h. Alternatively or additionally, additional information about the content may be displayed at the user interface 300 as part of, or in proximity to, the content elements 302a-h. Additional information may include, for example, a user name or handle of a user associated with content (e.g., a user who created content, completed a challenge, created a challenge or challenge list, and the like), a title of a post, challenge, and/or challenge list, a timeframe associated with a challenge or challenge list (e.g., an amount of time remaining to complete a challenge to obtain a reward), a link to view more information about a challenge, locations of a challenge, specific requirements and/or steps to complete a challenge, a time that the content was posted, content uploaded by other users upon completion of the challenge, and/or similar information. In some examples, the additional information may include selectable elements to interact with content, such as by liking content, sharing content with other users, and the like.

The user interface 300 may include additional elements, such as a search element 304. The search element 304 may be selectable to allow the user to search for content, challenges, challenge lists, and/or users through input of keywords into the search element 304 and/or another interface presented upon selection of the search element. Input may be, for example, through typing or speaking text input. In some examples, a search interface may include additional features, such as auto completion of search terms, filtering of search results, and the like. Navigation elements 306a-d may be selectable to navigate through different user interfaces of the platform application 102. For example, navigation element 306a may be selectable to navigate a user to a home screen of the platform application 102. Navigation element 306b may be selectable to navigate to a user interface allow the user to search for content, challenges, challenge lists, users, and the like using keywords. Navigation element 306c may be selectable to navigate to a user interface allowing the user to add content, challenges, challenge lists, posts, and the like. Navigation element 306d may be selectable to navigate to the user's user profile within the platform application 102.

Figure 5:
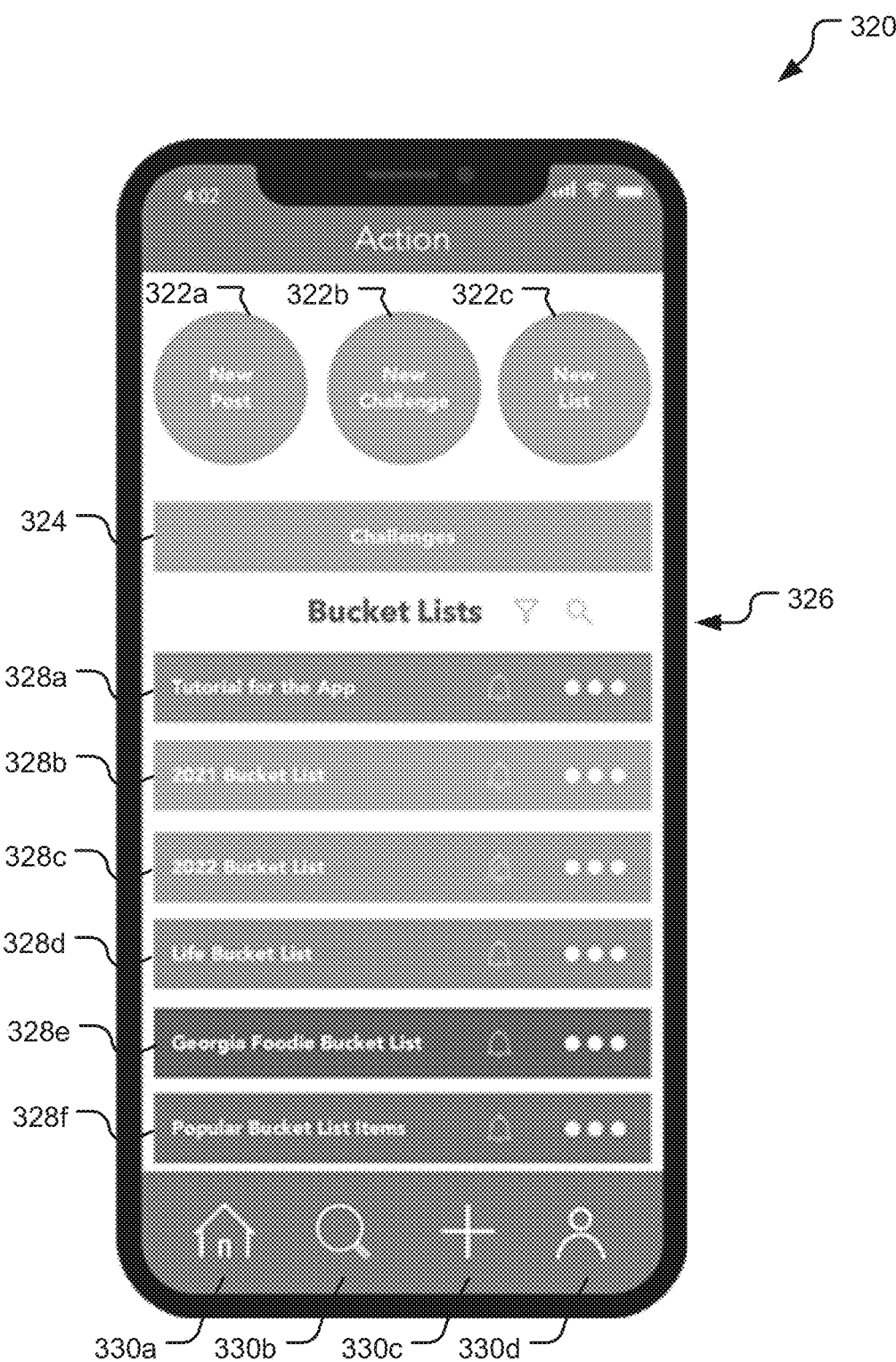
FIG. 5 illustrates an additional example user interface for interaction with the platform application in accordance with various embodiments of the disclosure.

FIG. 5 illustrates an additional example user interface 320 for interaction with the platform application 102 in accordance with various embodiments of the disclosure. The user interface 320 may be generated, for example, by the UI generation 114 of the platform application 102 and transmitted to a user interface 124 at a user device 106b via the network 108. Through the user interface 320, a user may be able to create new challenges, challenge lists, and/or content related to challenges. In various examples, the user interface 320 may be generated by UI generation 114 responsive to selection of navigation element 306c in the user interface 400.

The user interface 320 may include elements 322a-c, for creating new content. For example, elements 322a, 322b, and 322c may be selectable to create new posts, new challenges, and new challenge lists, respectively. The elements 322a-c may, when selected prompt the UI generation 114 to generate a new user interface for input of information related to creation of new content. For example, after selection of element 322a, a new user interface may be rendered, allowing the user to provide, for example, video, pictures, access to camera features, text input, filters, and the like to create posts. The new user interface may further allow the user to provide additional information for a post, such as a title, caption, description, tagging other users, and the like. After a new post is created, the post may appear, for example, on the user's profile, on a challenge page (when the post is related to completion of a challenge), and/or as a content element for other users of the platform application 102.

Similarly, after selection of element 322b, a new user interface may be rendered (e.g., by UI generation 114) at the user device allowing the user to configure a new challenge. For example, the user may be able to provide video and/or picture content, text content, links to other applications (e.g., location mapping), and the like. For example, a user may utilize the new user interface to provide a title for a challenge, a location for the challenge, an end time for the challenge, a category (e.g., fitness, food, travel, finances), and/or a privacy setting for the challenge. For example, a privacy setting may keep a challenge private to the user, shared with a group of other users specified by the user, shared with other users associated with the user (e.g., friends or followers), or public. Some users (e.g., business users or other users) may further be able to associate a challenge with a badge or digital reward upon completion.

After selection of element 322c, a new user interface may be rendered (e.g., by UI generation 114) to allow the user to create a new challenge list (e.g., bucket list). The new interface may allow the user to search for challenges to add to a new challenge list, enter additional information (e.g., a title) for the challenge list, share the challenge list with other groups of users, and the like.

The user interface 320 may further include selectable elements 328a-f, showing, for example, challenge lists already created by the user. In some examples, element 324 may be selectable to change the view presented by the user interface 320 such that the selectable elements 328a-f display challenges instead of challenge lists. In some examples, the elements 328a-f may be selectable to view details about the challenge list or challenge represented by the element. Further, the elements 328a-f may incorporate additional features or elements for, for example, editing a challenge list and/or turning on notifications related to a challenge list.

Figure 6:
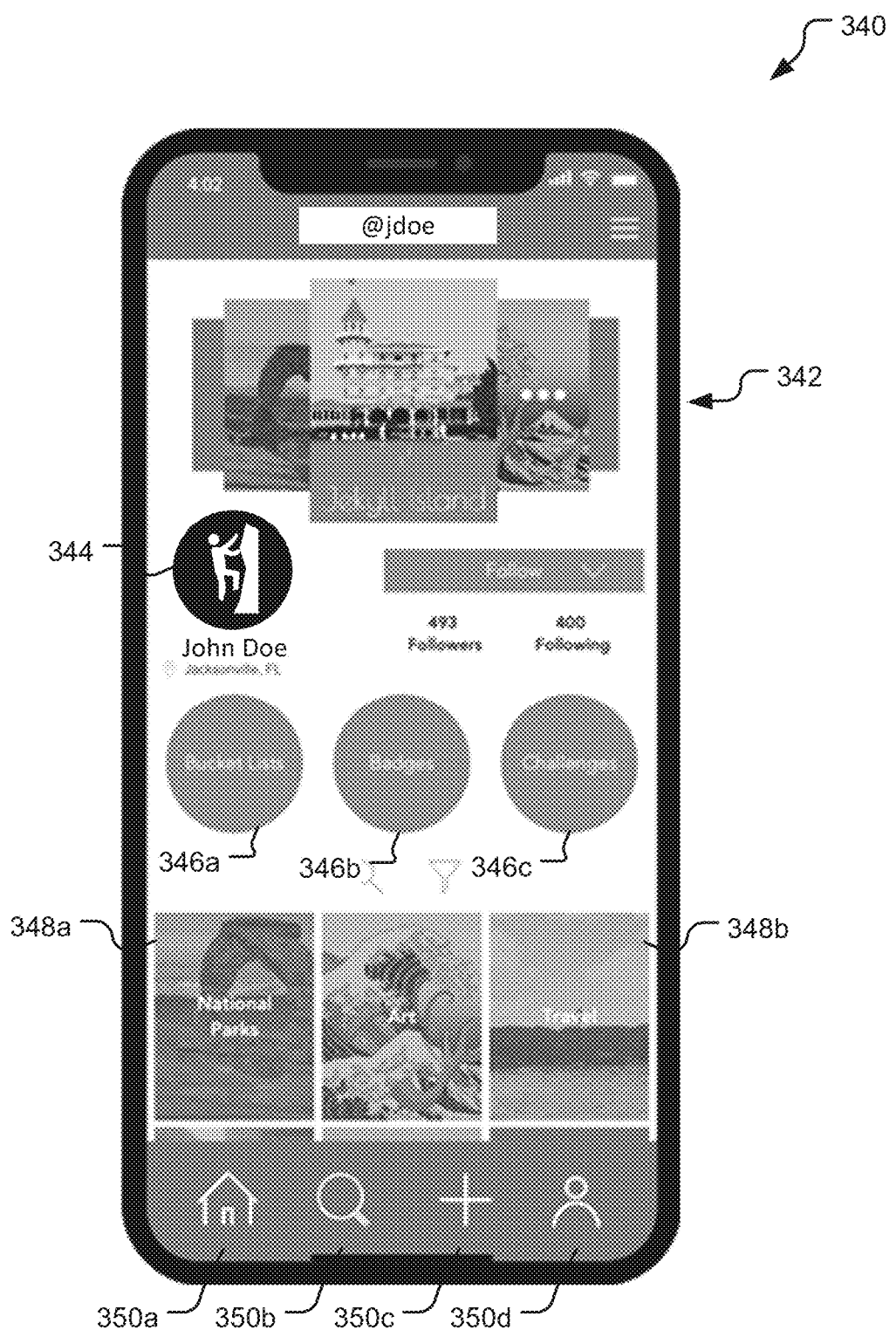
FIG. 6 illustrates an example user interface displaying a user profile on the platform application in accordance with various embodiments of the disclosure.

FIG. 6 illustrates an example user interface 340 displaying a user profile on the platform application 102 in accordance with various embodiments of the disclosure. The user interface 340 may be generated, for example, by the UI generation 114 of the platform application 102 and transmitted to a user interface 124 at a user device 106b via the network 108. The user profile may include various elements, such as, for example, a profile picture 344, elements 348a and 348b showing challenges associated with the user. In various examples, such challenges may be challenges which the user has accepted and are currently in progress and/or challenges which the user has completed. In various examples, elements shown in the user profile may further include content uploaded by the user. The user profile may further include elements 346a-c, which may be selectable to view different content associated with the user at the profile page. For example, selecting element 346a may display bucket lists (e.g., challenge lists) that the user has accepted and/or created. Similarly, selecting element 346c may display challenges that the user has accepted and/or created. Selecting element 346b may display badges that the user has earned through, for example, completion of challenges.

In various examples, the user profile user interface 340 may include a showcase element 342. The showcase element 342 may have a carousel functionality, where users can swipe right and left through tiles in the showcase element 342 to view them. In some examples, clicking on a tile in the showcase elements will direct a user to a specific post or other piece of content chosen by and/or posted by the user.

Figure 7:
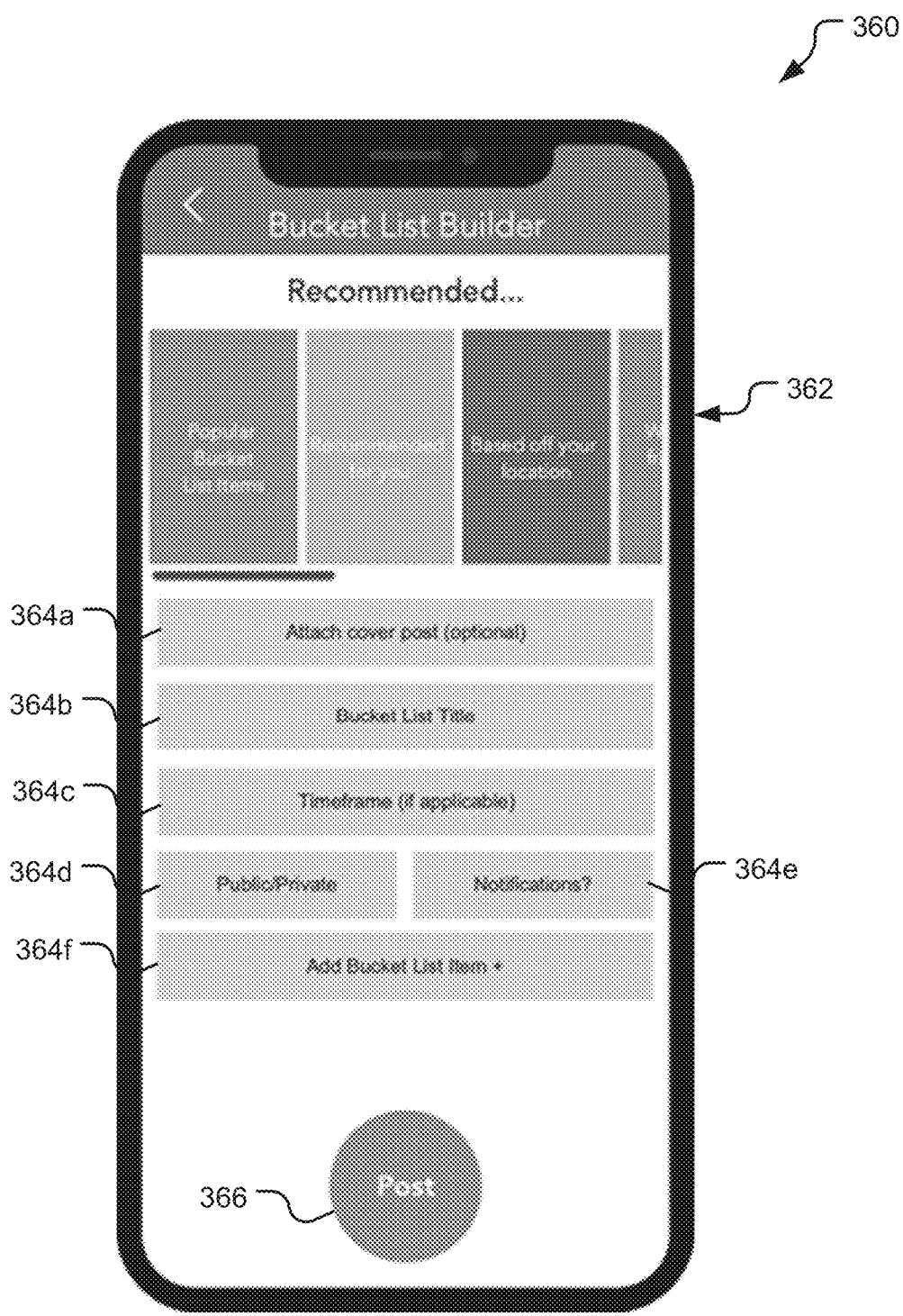
FIG. 7 illustrates an example user interface for generation of challenge lists in the platform application in accordance with various embodiments of the disclosure.

FIG. 7 illustrates an example user interface 360 for generation of challenge lists in the platform application 102 in accordance with various embodiments of the disclosure. The user interface 360 may be generated, for example, by the UI generation 114 of the platform application 102 and transmitted to a user interface 124 at a user device 106b via the network 108. In various examples, the user interface 360 may be generated (e.g., by UI generation 114) responsive to selection of an element to create a new challenge list elsewhere in the platform application 102 (e.g., element 322c in user interface 320). The user interface 360 may include fields for input of information about the challenge list. For example, field 364b may allow a user to input a title for the challenge list. Other elements may be selectable to allow the user to, for example, add items to the challenge list, update timeframe for completion of the challenge list, enable and/or disable notifications related to the challenge list, change privacy settings related to the challenge list, and the like.

The user interface 360 may further include a recommendation feature 362, which may include various elements to recommend challenges to the user for inclusion in the challenge list. For example, the recommendation feature 362 in the user interface 360 includes tiles selectable to view popular bucket list items, items recommended for the user, and items selected based on the user's location. In some examples, the recommendation feature 362 may further include tiles recommending items based on, for examples, challenges already added to the challenge list. The user interface 360 may further include an element 366 selectable to post the created challenge list. Once the challenge list is created, the user may choose to post the challenge publicly, on the user's profile, to selected friends and/or followers, or in other locations in the platform application 102 based on, for example, the user's privacy settings.

Figure 8:
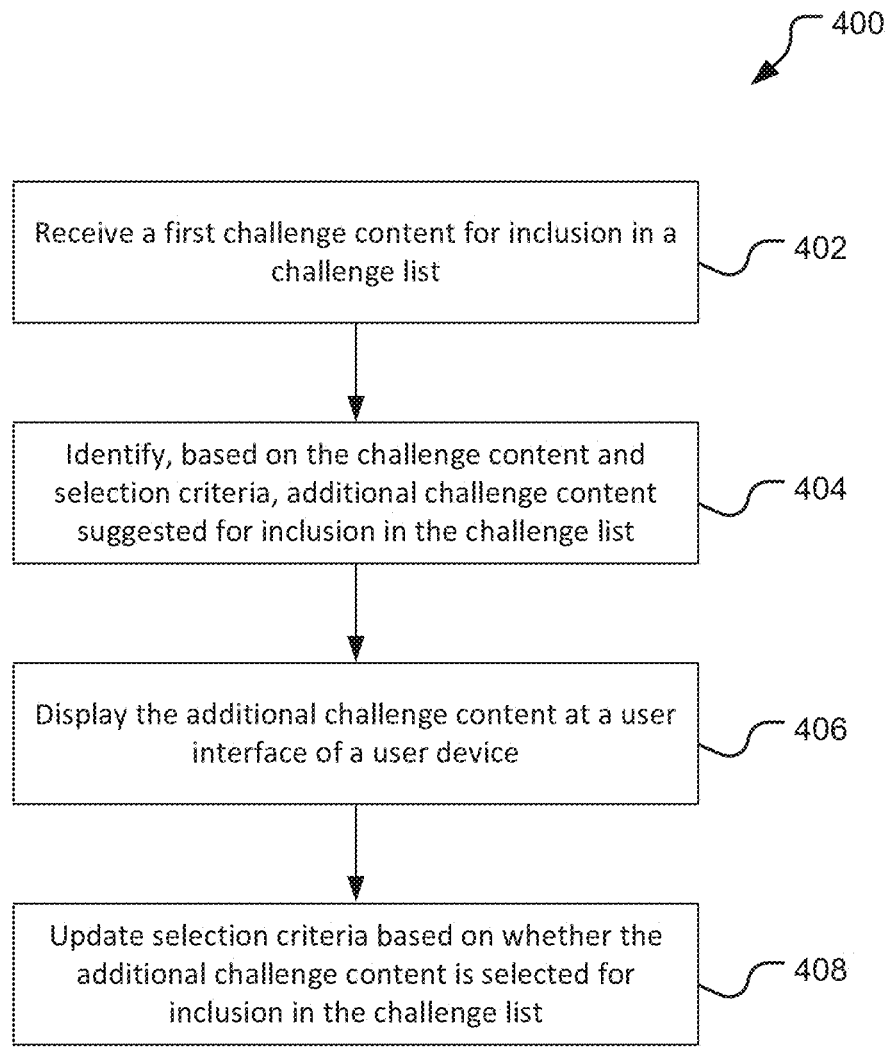
FIG. 8 is a flow diagram of an example method for generating challenge lists in the platform application in accordance with various examples described herein.

FIG. 8 is a flow diagram of an example method 400 for generating challenge lists in the platform application 102 in accordance with various examples described herein. At block 402, the platform application 102 receives a first challenge content for inclusion in a challenge list. In various examples, the platform application 102 may receive the first challenge content through a user interface 124 of a user device 106b accessing the platform application 102. For example, the user interface 360 of FIG. 7 may be utilized to add challenge content to a challenge list. Challenge content may include, for example, a challenge and associated information, such as challenge location, duration, associated rewards, and the like. In various examples, the first challenge content may be associated with one or more tags, categories, or other identifiers used to categorize the first challenge. For example, a user may categorize a created or chosen challenge as being related to travel, outdoors, national parks, etc. In various examples, challenge content may include challenges including, for example, completion of an outdoor activity (e.g., hiking a particular trail, rock climbing at a particular location, fishing at a particular river), visiting a predetermined number of tourist location, completing an artistic activity, cooking a specific meal, running a marathon, visiting a number of locations of a restaurant, or reading a specific number of books in a period of time (e.g., finishing 10 books in a month). Other challenge content may be included in various challenge lists.

The platform application 102 identifies additional challenge content suggested for inclusion in the challenge list at block 404. The additional content may be identified based on the first challenge content and one or more selection criteria. The additional challenge content may be identified from a challenge database including challenges created by the user and other publicly available challenges. Various selection criteria may be used, including selection criteria related to the user (e.g., user preferences), information about a challenge list, and/or challenge lists created by other users. For example, the user may have created multiple challenge lists each devoted to hiking trails in various locations. When the user creates a new challenge list listing, for example, a hike to Delicate Arch in Arches National Park, the platform application 102 (e.g., content recommendation 118) may suggest additional challenges for inclusion in the challenge list related to hiking other trails in and around Arches National Park. In some examples, content recommendation 118 of the platform application 102 may utilize a machine learning model for selecting additional challenge content. For example, content recommendation 118 may include a neural network trained to identify additional challenge content for inclusion in a challenge list based on challenge content already selected for the challenge list.

At block 404, the platform application 102 displays the additional challenge content at a user interface 124 of a user device 106b. For example, the additional challenge content may be displayed to the user as a synopsis of the suggested additional challenge, a link to an additional user interface with information about the additional challenge, and the like.

The platform application 102 updates the selection criteria based on whether the additional challenge content is selected for inclusion in the challenge list at block 408. In various examples, the user may be able to select (e.g., through a user interface 124) whether to include a suggested challenge content in a challenge list. When the user selects to include the challenge in the challenge list or declines to include the challenge in the challenge list, the platform application 102 may note the user's decision and update selection criteria and/or a machine learning model used by content recommendation 118 based on the user's selection. For example, where a user declines to add a challenge item related to fishing to a challenge list related to outdoor activities, content recommendation 118 may recommend fewer fishing related challenges to the user in the future. In some examples, where content recommendation 118 includes a machine learning model, such updating of selection criteria may be in the form of a feedback loop to the machine learning model.

Figure 9:
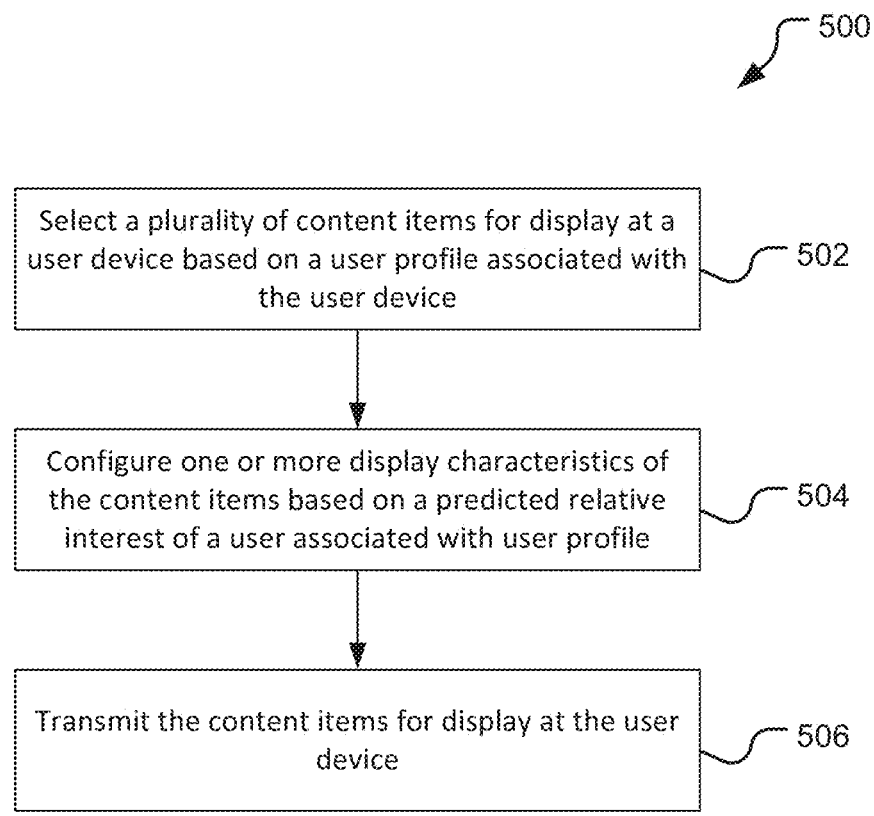
FIG. 9 is a flow diagram of an example method of displaying a plurality of content items of the platform application at a user interface in accordance with various examples described herein.

FIG. 9 is a flow diagram of an example method 500 of displaying a plurality of content items of the platform application 102 at a user interface in accordance with various examples described herein. The platform application 102 selects a plurality of content items for display at a user device at block 502. The plurality of content items are selected based on a user profile associated with the user device. For example, a user profile may include various information provided by the user at registration (e.g., location, age, gender, interests), information obtained through third party sources, such as authorized connections to other social media sites, and/or the user's actions on the platform application 102, such as challenges accepted and completed by the user, challenges accepted and completed by friends or other users associated with the user, and the like. In some examples, the user profile may further include a geographic area (e.g., a geofence) which may be created by the user accessing the hardware of the user device 106b. For example, a user may specify that they want to view challenges within a 20 mile radius of the location of the user device 106b, as determined by hardware of the user device 106b, such as GPS data, connections to wireless networks, altimeter data, and the like. The platform application 102 (e.g., content recommendation 118) may then access challenge data (e.g., a challenge database) and locate challenges that would be relevant to the user based on the user data.

In some examples, the plurality of content items may further be selected based on user data of other users of the platform application 102. For example, a user may travel with a second user of the platform application 102, where the second user has associated second user data. When the second user agrees to share the second user data with the user, the user may request the platform application 102 display challenge content that may be of interest to both the user and the second user. For example, where both the user and the second user have completed challenges including hiking, the platform application 102 may display challenge content related to hiking. Where the user has completed challenges including free climbing, but the second user has no interest in rock climbing (including free climbing), the platform application 102 may not display free climbing challenge content where it would have displayed such challenge content when only taking the user data associated with the user into account.

At block 504, the platform application 102 (e.g., UI generation 114) configures one or more display characteristics of the content items based on a predicted relative interest of a user associated with the user profile. In various examples, UI generation 114 may display content items based on predicted relative interest to the user. In some examples, a measure of predicted relative interest may be passed to UI generation 114 by content recommendation 118. For example, content recommendation 118 may choose content based on a predicted interest score for the user, and the score may be passed to UI generation 114. In such examples, UI generation 114 may then render content with a higher score more prominently that content with a lower score, where a higher score indicates higher predicted interest. Display characteristics which may be configured be UI generation 114 at block 504 include, for example, location of content items, size of content items, background colors, fonts, and other features.

The platform application 102 transmits the content items for display at the user device at block 506. The content items may be displayed at, for example, a mobile application. For example, user interface 300 of FIG. 4 shows content items 302a-h presented to a user and sized based on relative predicted interest.

Figure 10:
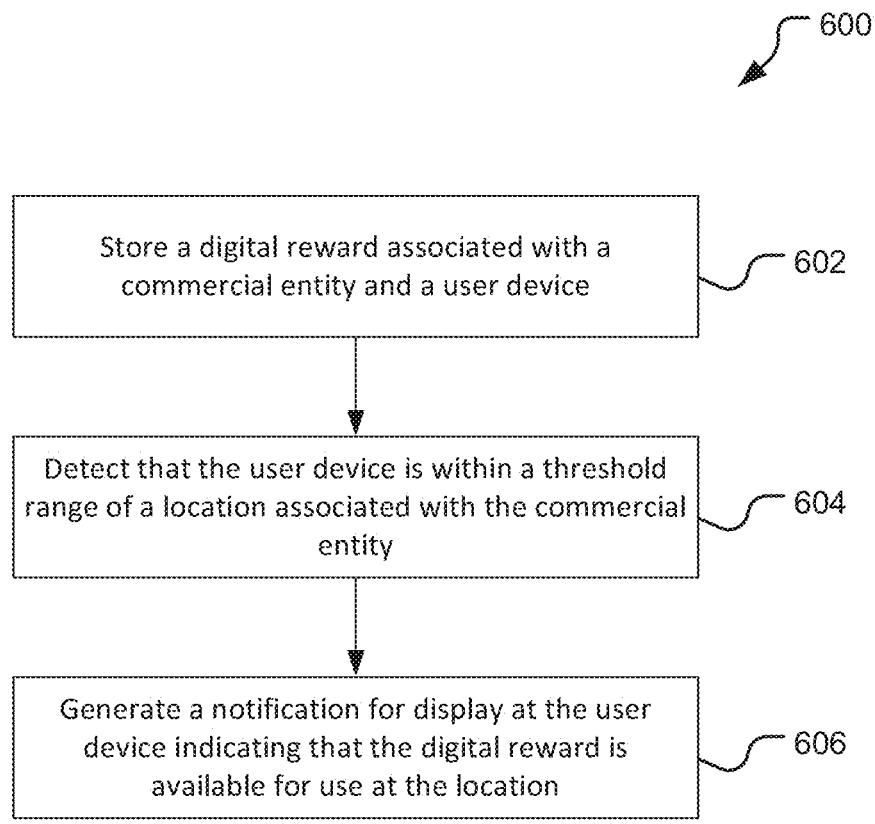
FIG. 10 is a flow diagram of an example method of utilizing digital rewards obtained through the platform application in accordance with various examples described herein.

FIG. 10 is a flow diagram of an example method of utilizing digital rewards obtained through the platform application in accordance with various examples described herein. At block 602, the platform application 102 stores a digital reward associated with a commercial entity and a user device. Digital rewards may include, for example, coupons, discounts, vouchers for goods and services, recognition (e.g., virtual and/or physical badges or patches) and the like. In various examples, digital rewards may be earned by a user by completing a challenge. For example, a restaurant may sponsor a challenge to eat a certain number of items from the restaurant's menu within a given time period. Upon successful completion of the challenge, a user may receive a digital reward from the restaurant for discounts on future visits, free meals, etc. When a user earns a digital reward, the platform application 102 may store the digital reward at a datastore (e.g., datastore 104b) along with information about, for example, the commercial entity associated with the reward, expiration date of the reward, and the like.

The platform application 102 detects that the user device is within a threshold range of a location associated with the commercial entity at block 604. The platform application 102 may detect that a user is within a threshold range of a location (e.g., a restaurant or retail location) in several ways. In some examples, the platform application 102 may access location data (e.g., GPS data) of the user device 106b and may detect that the device is in a threshold range based on the device being at a particular location or within a specific subset of GPS coordinates. In some examples, the platform application 102 may search for locations along or near travel routes, such as when the user utilizes the user device 106b to navigate from one location to another. In some examples, the platform application 102 may detect a connection to a beacon, wireless network, or other device at a location in order to detect that the user is within a threshold range of the location.

At block 606, the platform application 102 generates a notification for display at the user device indicating that the digital reward is available for use at the location. In various examples, the platform application 102 may generate a push notification, audible notification, or the like to alert the user of the available digital reward. In some examples, such alerts may include a link to the reward such that the user can view additional information related to the reward. Such links may also link to codes or other indicia used to redeem the reward. For example, the notification may like to a QR code scanned by a cashier to redeem free merchandise. Accordingly, users are more likely to use rewards and, accordingly, may be more motivated to earn rewards through the platform application 102, as they are less likely to forget about available rewards.

In various examples, after generating the notification indicating that the reward is available for use, the platform application 102 may generate a code allowing the user to redeem the reward at the location. For example, the notification may be selectable by the user. Upon selection, the platform application 102 may generate a code, which may be viewed through the display of the user device, allowing the user to redeem the reward. For example, a code may include a quick read (QR code), barcode, alphanumeric code, and the like. In some examples, the code may be displayed responsive to another action by the user, such as placing an order. For example, the notification may be selectable to place an online order for a product or service connected with the digital reward. The code may be generated and/or displayed to provide payment through the user device. The code may, additionally, be generated and/or displayed for the user to provide payment upon arrival at the location (e.g., to pick up an ordered product associated with the digital reward).

In accordance with the above description, an experience based social media platform may allow users to engage with one another in a positive manner, increasing user engagement with the platform. Further the platform may allow businesses, entities, and other sponsored users to engage with users by sponsoring challenges, providing rewards for completion of challenges, designing custom challenges, and the like. Such methods of engagement may allow businesses to engage with possible customers in ways beyond traditional advertising and promotion. Further, the platform may include privacy settings allowing users transparency with respect to how user data are utilized and to control how user data are utilized within the platform. Such privacy and data controls may increase user engagement, as users know exactly how their data are managed and utilized by the platform.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the claims that follow and as may be amended.

The invention claimed is:

1. A method comprising:
   training a machine learning model to identify similar challenges, wherein predictions are based on user activity, and activity of users associated with each other, profile information;
   receiving, from a user device, a first challenge content for inclusion in a challenge list;
   identifying, via the machine learning model, based on the first challenge content and selection criteria, additional challenge content suggested for inclusion in the challenge list;
   displaying the additional challenge content at a user interface of the user device;

updating the selection criteria based on whether the additional challenge content is selected for inclusion in the challenge list; and refining the machine learning model using feedback comprising whether the additional challenge content is selected for inclusion in the challenge list, wherein the machine learning model is refined using selections of suggested challenge content and inaction in relation to the suggested challenge content across multiple users; wherein:

the first challenge content is tracked and classified using metadata, wherein the first challenge content is classified within a category;

the additional challenge content is tracked and classified using the metadata, wherein the additional challenge content is classified within the category or a sub-category of the category; and the additional challenge content is identified further based on;

the category of the first challenge content being related to the additional challenge content.

2. The method of claim 1, wherein the selection criteria includes one or more user preferences associated with the user device.

3. The method of claim 1, wherein the additional challenge content is selected from a database of challenge content associated with challenges publicly available to the user device.

4. The method of claim 3, wherein the selection criteria includes the additional challenge content being associated with a similar challenge list in the database of challenge content.

5. The method of claim 1, wherein identifying the additional challenge content comprises:

providing the first challenge content to a machine learning model trained to identify the additional challenge content for inclusion in the challenge list based on challenge content already selected for the list.

6. The method of claim 5, wherein updating the selection criteria comprises updating the machine learning model by providing an indication of whether the additional challenge content is selected for inclusion in the challenge list to the machine learning model through a feedback loop.

7. The method of claim 1, further comprising:

identifying a second additional challenge content for inclusion in the challenge list based on the first challenge content, the additional challenge content, and the updated selection criteria.

8. The method of claim 1, wherein the first challenge content comprises one or more of completion of an outdoor activity, visiting a predetermined number of tourist locations, completing an artistic activity, cooking a predetermined meal, running a marathon, visiting a predetermined number of locations of a restaurant, and reading a predetermined number of books.

9. The method of claim 1, wherein the metadata includes one or more of: geolocation information, associated costs, age restrictions, physical difficulty, contact information for an entity associated with the first challenge content or the additional challenge content, respectively, or content generated by other users who have completed the first challenge content or the additional challenge content, respectively.

10. The method of claim 3, wherein the database includes a coding system including codes associated with each classification of a set of classifications.

11. The method of claim 10, wherein:

the set of classifications includes a parent category and at least one sub-category.

12. The method of claim 11, wherein:

the parent category is associated with a first code, and each of the at least one sub-category is associated with a unique code; and wherein challenge content is tracked using a combination of the first code associated with the parent category and the unique code of each of the at least one subcategory.

* * * * *